(12) United States Patent
Koh

(10) Patent No.: US 7,099,252 B2
(45) Date of Patent: Aug. 29, 2006

(54) METHOD AND APPARATUS FOR REMOVING VIBRATION IN DISC DRIVE

(75) Inventor: Young-ok Koh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 10/384,563

(22) Filed: Mar. 11, 2003

(65) Prior Publication Data
US 2003/0214891 A1    Nov. 20, 2003

(30) Foreign Application Priority Data
Mar. 12, 2002    (KR)    ........................... 2002-0013255

(51) Int. Cl.
*G11B 7/00*    (2006.01)
(52) U.S. Cl. .............................. 369/53.18; 369/53.12; 369/53.14
(58) Field of Classification Search ............ 369/47.36, 369/44.32, 53.23, 53.14, 53.15, 53.12, 53.19, 369/53.18
See application file for complete search history.

(56) References Cited

U.S. PATENT DOCUMENTS

| 6,097,680 | A   | 8/2000  | Yen et al.     |          |
|-----------|-----|---------|----------------|----------|
| 6,181,652 | B1  | 1/2001  | Katou et al.   |          |
| 6,256,275 | B1* | 7/2001  | Eguchi et al.  | 369/44.32 |
| 6,351,440 | B1* | 2/2002  | Fukuda et al.  | 369/47.36 |
| 6,377,527 | B1* | 4/2002  | Hirashima      | 369/53.23 |
| 6,826,136 | B1* | 11/2004 | Jeong          | 369/47.44 |

FOREIGN PATENT DOCUMENTS

JP    6-44595    2/1994

(Continued)

OTHER PUBLICATIONS

Japanese Office Action dated Dec. 14, 2005 in Japanese Application No. 091124467.

(Continued)

*Primary Examiner*—Nabil Hindi
(74) *Attorney, Agent, or Firm*—Staas & Halsey LLP

(57) ABSTRACT

Provided are a method and apparatus for removing vibration due to the imbalance of weight of a disc in a disc drive, in which the allowable high multi-speed of a disc is determined based on the allowable amount of vibration in the disc drive and the disc drive is actuated within a range of the allowable high multi-speed. The method includes detecting the amount of vibration corresponding to the degree of imbalance of the weight of a disc inserted into the disc drive and increasing a set high multi-speed of the disc drive until the amount of vibration reaches an allowable amount of vibration with respect to the disc drive. Accordingly, vibration in a disc drive can be controlled such that a user cannot perceive it and damages to the disc drive due to the vibration can be minimized.

9 Claims, 2 Drawing Sheets

FOREIGN PATENT DOCUMENTS

| | | |
|---|---|---|
| JP | 10-069709 | 3/1998 |
| JP | 10-69709 | 3/1998 |
| JP | 10-143991 | 5/1998 |
| JP | 11-73719 | 3/1999 |
| JP | 11-126419 | 5/1999 |
| JP | 2000-207824 | 7/2000 |
| JP | 2001-35068 | 2/2001 |
| KR | 1999-86964 | 12/1999 |
| KR | 2001-548 | 1/2001 |
| TW | 389885 | 5/2000 |
| TW | 392146 | 6/2000 |

OTHER PUBLICATIONS

Official Action issued by the Japanese Patent Office on Apr. 5, 2005 during examination of the corresponding Japanese application.

Preliminary Notice of the First Office Action issued by the Taiwanese Patent Office concerning Patent Application No. 091124467, dated Mar. 17, 2005.

Official Action issued by the Japanese Patent Office on Nov. 30, 2004 during examination of a corresponding Japanese application.

* cited by examiner

METHOD AND APPARATUS FOR REMOVING VIBRATION IN DISC DRIVE

CROSS-REFERENCE TO RELATED APPLICATIONS

This application claims the benefit of Korean Patent Application No. 2002-13255, filed on Mar. 12, 2002, in the Korean Intellectual Property Office, the disclosure of which is incorporated herein by reference.

BACKGROUND OF THE INVENTION

1. Field of the Invention

The present invention relates to an apparatus and method of removing vibration in a disc drive, and more particularly, to a method and apparatus for removing vibration that occurs from side to side in a disc drive when driving the disc in the disc drive.

2. Description of the Related Art

Vibration that occurs from side to side in a disc drive (hereinafter, "horizontal vibration") is caused when a disc rotation axis is slanted or vibrates or when the weight of the surface of a disc is disproportional with respect to the disc rotation axis. The horizontal vibration becomes serious when rotating a disc at a high speed and causes unstable operation of the disc drive and may reduce the lifetime of the disc drive.

In the past, to remove the horizontal vibration, a disc drive included a sensor for measuring the amount of vibration. If the sensor sensed vibration, the disc rotation speed was reduced to prevent the continuation of the horizontal vibration.

However, such a method is designed to remove horizontal vibration after the horizontal vibration has already occurred in a disc drive. Therefore, the vibration in the disc drive felt by a user is not avoidable. This effect lowers the reliability of the disc drive, and further, the vibration cannot be removed until the disc drive has vibrated for a period of time. Accordingly, it is difficult to prevent damage to the disc drive due to the horizontal vibration.

SUMMARY OF THE INVENTION

To solve the above problem, it is an aspect of the present invention to provide a method and apparatus for removing horizontal vibration in a disc drive before a user feels the vibration.

Additional aspects and advantages of the invention will be set forth in part in the description which follows and, in part, will be obvious from the description, or may be learned by practice of the invention.

It is another aspect of the present invention to provide a method and apparatus for removing horizontal vibration generated from factors such as imbalance of the weight of a disc in a disc drive by determining allowable multi-speed for the disc based on the allowable vibration amount of the disc drive.

To achieve the above and/or other aspects, a method for removing vibration in a disc drive includes detecting the amount of vibration corresponding to a degree of imbalance of the weight of a disc inserted into the disc drive and increasing a set high multi-speed of the disc drive until the amount of vibration reaches an allowable amount of vibration with respect to the disc drive.

In one implementation, increasing the high multi-speed of the disc drive includes setting the high multi-speed of the disc drive to be the allowable high multi-speed if the amount of vibration is above the allowable amount of vibration.

Detecting the amount of vibration may include detecting the first track number by rotating the disc at a predetermined low multi-speed, detecting the second track number by rotating the disc at a predetermined high multi-speed, calculating the difference between the first and second track numbers, and detecting the amount of vibration corresponding to the calculated difference. Detecting the amount of vibration also may include setting the currently set high multi-speed of the disc drive to be the allowable high multi-speed without detecting the corresponding amount of vibration, when the first and second track numbers are the same. The allowable amount of vibration may be determined within a range where a user cannot perceive vibration in the disc drive.

To achieve the above and/or other aspects, an apparatus for removing vibration in a disc drive includes a rotating unit rotating a disc, a memory unit for storing an allowable amount of vibration with respect to the disc drive, and a system controller detecting the amount of vibration corresponding to a degree of imbalance of the weight of the disc and controlling the rotating unit by increasing the allowable amount of high multi-speed of the disc until the amount of vibration reaches the allowable amount of vibration.

In one implementation, the system controller determines a currently set high multi-speed of the disc drive as the allowable high multi-speed with respect to the disc if the amount of vibration is above the allowable amount of vibration.

The system controller also may detect the degree of imbalance of the weight of the disc using first and second track numbers, the first track number being detected by rotating the disc at a predetermined low multi-speed and the second track number being detected by rotating the disc at a predetermined high multi-speed.

BRIEF DESCRIPTION OF THE DRAWINGS

These and other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
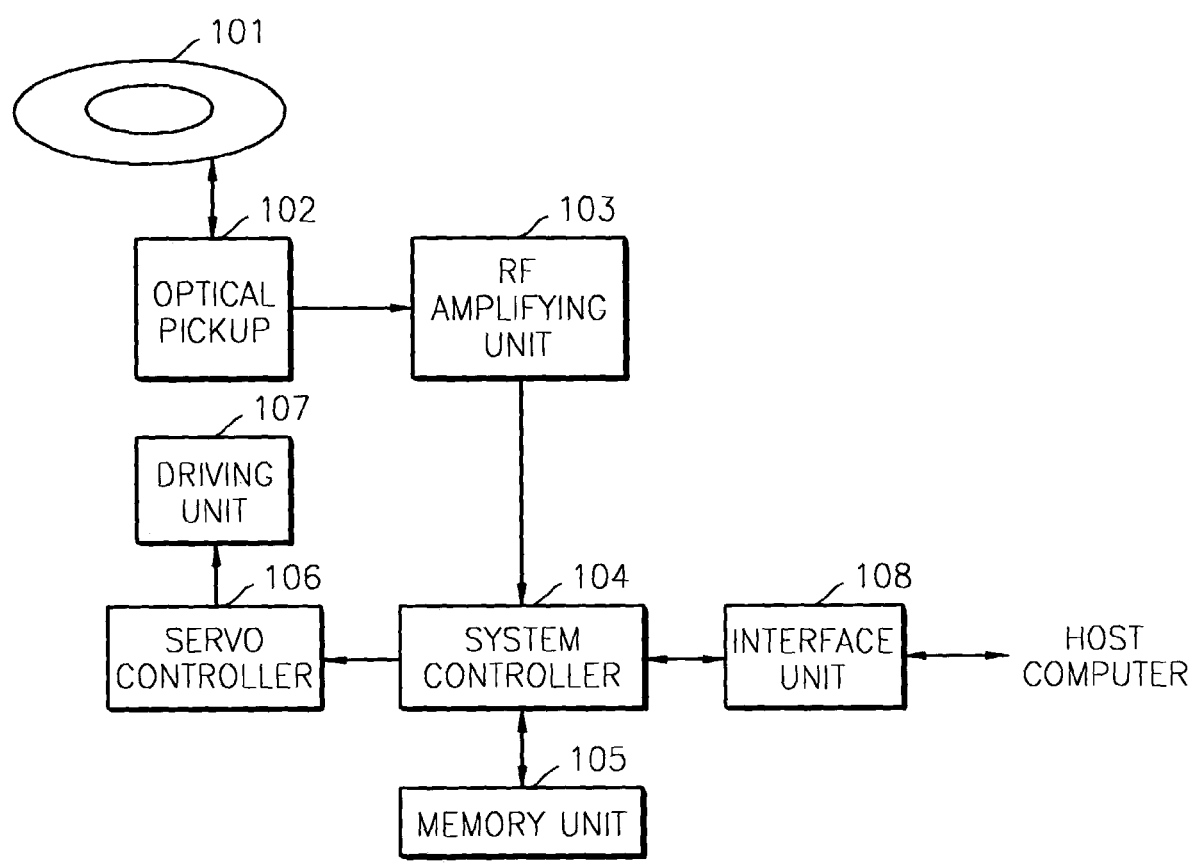
FIG. 1 is a block diagram of a disc drive including an apparatus for removing vibration according to an embodiment of the present invention.

Reference will now be made in detail to the embodiments of the present invention, examples of which are illustrated in the accompanying drawings. Like reference numerals refer to the like elements throughout the specification and the drawings.

FIG. 1 is a block diagram of a disc drive having a vibration removing apparatus according to an embodiment of the present invention. Referring to FIG. 1, the disc drive utilizes a disc 101 and includes an optical pick-up 102, a radio-frequency (RF) amplifying unit 103, a system controller 104, a memory unit 105, a servo controller 106, a driving unit 107, and an interface unit 108.

The disc 101 is an optical medium, such as a compact disc (CD) or a digital versatile disc (DVD). The disc 101 may have a weight not evenly distributed around the disc rotation axis.

The optical pick-up 102 emits light on the disc 101 when the disc 101 rotates, receives light reflected from the disc 101, converts the received light into an RF signal, and outputs the RF signal.

The RF amplifying unit 103 amplifies the RF signal output from the optical pick-up 102 to a predetermined level and generates a tracking error signal TE and a focusing error signal FE from the RF signal output. The tracking error signal TE and the focusing error signal FE may be obtained from the RF signal output using one of various methods implemented by existing disc drives.

Figure 2:
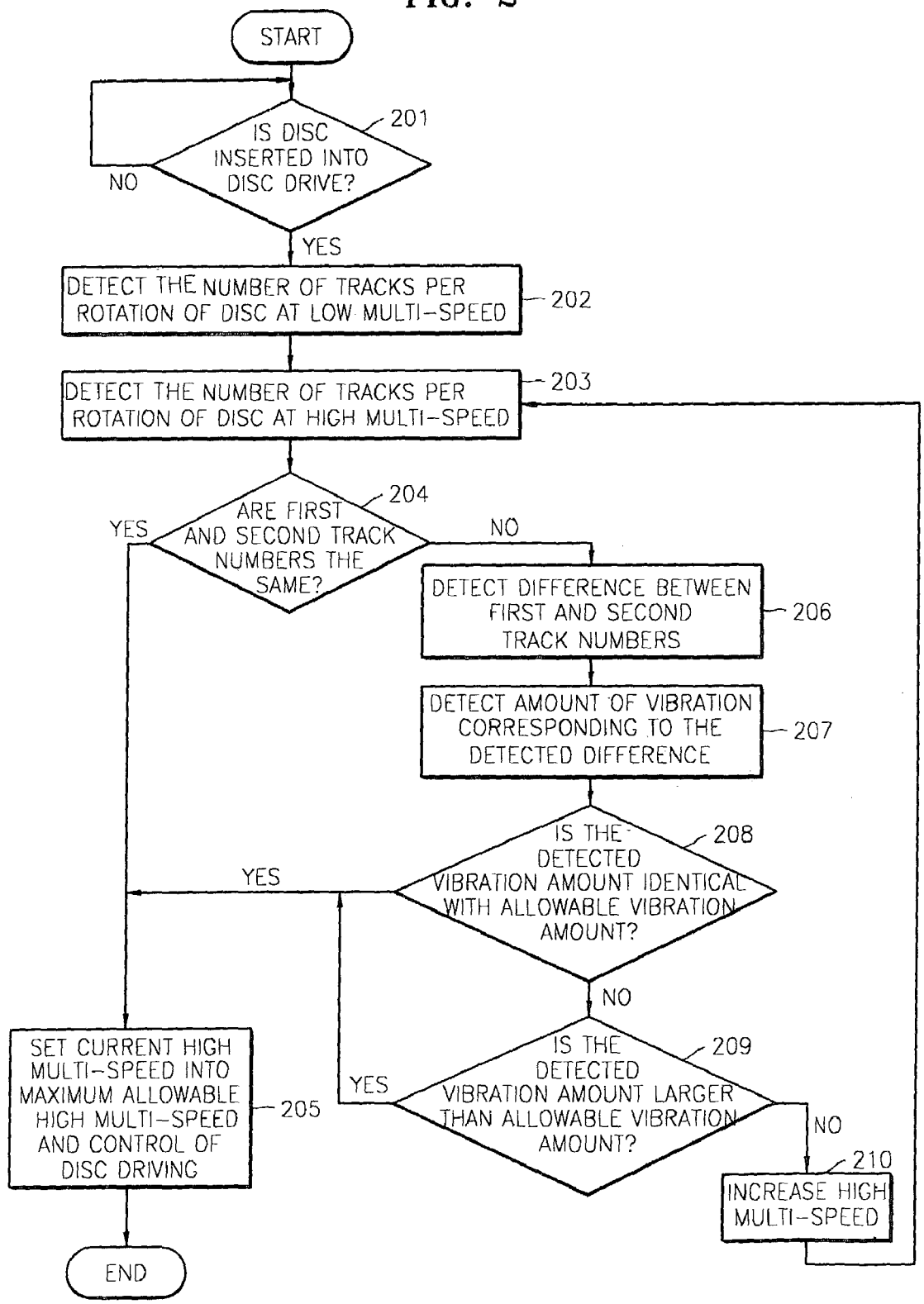
FIG. 2 is a flowchart explaining a method of removing vibration according to an embodiment of the present invention.

The system controller 104 controls the operations of the disc drive while exchanging data with a host computer (not shown) via the interface unit 108. The system controller 104, as illustrated in FIG. 2, limits horizontal vibration generated in the disc drive before a user feels the horizontal vibration. FIG. 2 is a flowchart explaining an embodiment of a method of removing vibration generated in the disc drive.

Referring to FIGS. 1 and 2, the system controller 104 checks if the disc 101 is inserted into the disc drive shown in FIG. 1 when the disc drive is actuated, in operation 201.

If the system controller 104 determines that a disc has been inserted in operation 201, the system controller 104 sends a control signal to the servo controller 106 so that the disc 101 is rotated at a predetermined low multi-speed, in operation 202. In response to the control signal, the servo controller 106 actuates the driving unit 107 to rotate the disc 101 at the predetermined low multi-speed. When the disc 101 is rotated, an RF signal is output from the optical pick-up 102 and transmitted to the RF amplifying unit 10. The system controller 104 receives a tracking error signal TE from the RF amplifying unit 103. Next, the system controller uses the tracking error signal TF 104 to detect the number of tracks generated per rotation of the disc 101 at the predetermined low multi-speed to produce a first track number. The predetermined low multi-speed may be two times (2×) or four times (4×) the original standard speed.

In operation 203, the system controller 104 sends a control signal to the servo controller 106 so that the disc 101 rotates at a predetermined high multi-speed. The high multi-speed may be ten times (10×) or the speed that corresponds to the maximum difference (or the maximum degree of imbalance of the weight of the disc 101) between the weight of the right and left surfaces of the disc 101 around the disc rotation axis. The maximum high multi-speed, corresponding to the maximum difference in weight, is established within a range where the amount of vibration generated in the disc drive does not exceed the amount of allowable vibration. The allowable vibration amount is a vibration amount that is predetermined within a range where a user does not sense the vibration generated in the disc drive.

For instance, if unbalanced disc weights, i.e., a difference between the weight of the right and left surfaces of the disc around the disc rotation axis, are 0.3 mg, 0.5 mg, 0.7 mg, and 1 mg, the maximum high multi-speeds of the disc drive corresponding to these eccentricity amounts are 24×, 20×, 16×, and 8×, respectively. The system controller 104 can output a control signal to rotate the disc 101 8× speed in operation 203 in order to account for the most severe disc imbalance of 1 mg, which causes the most severe vibration to occur.

The driving unit 107 rotates the disc 101 at the high multi-speed that is controlled and set by the servo controller 106. The system controller 104 detects, as a second track number, the number of tracks generated per rotation of the disc 101 at high multi-speed, which is determined based on the tracking error signal TE output from the RF amplifying unit 103.

The low and high multi-speeds may be determined during the manufacturing of the disc drive or may be determined via a host computer (not shown). When rotating the disc 101 at the high multi-speed or the low multi-speed, the position of the optical pick-up 102 may be different with respect to the disc 101.

In operation 204, the system controller 104 checks if the first and second track numbers are the same. As explained above, the first and second track numbers are derived from the tracking error signal by the system controller 104. If the first and second track numbers are the same, it means that the weight of the disc 101 is balanced. Thus, the system controller 104 sets the currently set high multi-speed to be the maximum allowable high multi-speed with respect to the disc 101 inserted into the disc drive and then controls the multi-speed within a range that does not exceed the set high multi-speed, in operation 205.

However, if the first and second track numbers are not the same, the weight of the disc 101 is considered unbalanced. Thus, the system controller 104 detects the difference between the first and second track numbers in operation 206. The difference between the first and second track numbers corresponds to the degree of imbalance of the weight of the disc 101. The larger the difference between the first and second track numbers, the greater the degree of imbalance of the weight of the disc 101. Accordingly, a large degree of imbalance of the weight of the disc 101 means a large difference between the weights of the right and left surfaces of the disc 101 around the disc rotation axis.

In operation 207, the system controller 104 calculates the amount of vibration corresponding to the detected difference. The amount of vibration corresponding to the detected difference is one that corresponds to a detected difference selected from predetermined amounts of vibration. Information regarding the amounts of vibration can be stored in the memory unit 105 or the system controller 104.

If the number of all the detected differences possible is N, the number of the amounts of vibration stored in the memory unit 105 or the system controller 104 may be N or the number of groups obtained by dividing all the detected differences possible by a certain number. For instance, if the number of all the detected differences possible is 12 and is divided into groups of four, the number of the stored amounts of vibration becomes 4.

In operation 208, the system controller 104 checks whether the vibration amount detected in operation 207 is identical with the allowable vibration amount. The allowable vibration amount is stored in the memory unit 105 or the system controller 104 in advance, as mentioned in operation 203. If the vibration amount detected in operation 207 and the allowable vibration amount are the same, the method proceeds to operation 205 where the currently set high multi-speed is set to the maximum allowable high multi-speed with respect to the inserted disc 101.

If the vibration amount detected in operation 207 and the allowable vibration amount are not the same, the method proceeds to operation 209. Operation 209 determines if the vibration amount detected in step 207 is larger than the allowable vibration amount. When the vibration amount detected in step 207 is larger than the allowable vibration amount, the method again proceeds to step 205 where the currently set high multi-speed is set to the maximum allowable high multi-speed with respect to the inserted disc 101 and the driving of the disc 101 is controlled.

However, in step 209, if the detected vibration amount is not larger than the allowable vibration amount, the method proceeds to step 210 where the currently set high multi-speed is increased. For instance, the currently set high multi-speed is increased by one level and set as a new high multi-speed. Next, the method returns back to step 203 and the aforementioned process is repeated. In other words, the high multi-speed is repeatedly increased until the amount of vibration detected using the track numbers reaches the allowable amount of vibration.

The memory unit 105 stores information regarding the amount of vibration corresponding to all the differences possible between the weights of the right and left surfaces of the disc 101 around the disc rotation axis and allowable amount of vibration generated in a disc drive. The allowable amount of vibration indicates a predetermined amount of vibration that a user cannot sense regardless of the difference between the weights of the right and left surfaces of the disc 101 around the disc rotation axis, as described with reference to step 203.

The servo controller 106 and the driving unit 107 operate as rotating units that rotate the disc 101 at a multi-speed required by the system controller 104. The servo controller 106 and the driving unit 107 can control the rotation of the disc 101 by a general method.

According to the present invention, the allowable amount of vibration in a disc drive is selected at a level that is not perceptible to a user. The difference between the weight of the right and left surfaces of a disc around a disc rotation axis, i.e., the degree of imbalance of the weight of a disc, is compared with the allowable amount of vibration. The maximum allowable high multi-speed for each disc is determined according to the comparison result and the driving of the disc is controlled at or below the allowable high multi-speed. As a result, the user hardly senses any horizontal vibration when operating the disc drive. Furthermore, the reliability of the disc drive is increased and damage to the disc drive is reduced by minimizing the horizontal] vibration.

Although a few embodiments of the present invention have been shown and described, it will be appreciated by those skilled in the art that changes may be made in these embodiments without departing from the principles and spirit of the invention, the scope of which is defined in the appended claims and their equivalents. For example, the invention may be implemented on other electronic devices, such as, for example, on a computer having a processor operable to control the disc drive and storage or memory to access instructions that control the disc drive.

What is claimed is:

1. A method of controlling vibration in a disc drive, comprising:
    detecting an amount of vibration corresponding to a degree of imbalance of the weight of a disc inserted into the disc drive; and
    increasing a set high multi-speed of the disc drive gradually until the amount of vibration reaches an allowable amount of vibration,
    wherein the detecting of the amount of vibration comprises:
        detecting a first track number by rotating the disc at a predetermined low multi-speed;
        detecting a second track number by rotating the disc at a predetermined high multi-speed;
        calculating a difference between the first and second track numbers;
        detecting the amount of vibration corresponding to the calculated difference;
        setting the high multi-speed of the disc drive to be the allowable high multi-speed without detecting the corresponding amount of vibration, when the first and second track numbers are the same.

2. The method of claim 1, wherein the increasing of the high multi-speed of the disc drive comprises setting the high multi-speed of the disc drive to be the allowable high multi-speed if the amount of vibration is above the allowable amount of vibration.

3. The method of claim 1, wherein the detecting of the amount of vibration comprises using first and second track numbers, wherein the first track number is detected by rotating the disc at a predetermined low multi-speed and the second track number is detected by rotating the disc at a predetermined high multi-speed.

4. The method of claim 1, wherein the allowable amount of vibration is determined within a range where a user cannot perceive vibration in the disc drive.

5. An apparatus for removing vibration in a disc drive, comprising:
    a rotating unit that rotates a disc;
    a memory unit that stores an allowable amount of vibration with respect to the disc drive; and
    a system controller that detects an amount of vibration corresponding to a degree of imbalance of the weight of the disc, and controlling the rotating unit by increasing an allowable amount of high multi-speed of the disc gradually until the amount of vibration reaches the allowable amount of vibration,
    wherein:
        the system controller detects the difference between first and second track numbers as the degree of imbalance of the weight of the disc, the first track number of which is detected by rotating the disc at a predetermined low multi-speed and the second track number of which is detected by rotating the disc at a predetermined high multi-speed, and
        the system controller determines a currently set high multi-speed of the disc drive as the allowable high multi-speed without detecting the amount of vibration, when the first and second track numbers are the same.

6. The apparatus of claim 5, wherein the system controller determines a currently set high multi-speed of the disc drive as the allowable high multi-speed with respect to the disc if the amount of vibration is above the allowable amount of vibration.

7. The apparatus of claim 5, wherein the system controller detects the degree of imbalance of the weight of the disc using first and second track numbers, the first track number of which is detected by rotating the disc at a predetermined low multi-speed and the second track number of which is detected by rotating the disc at a predetermined high multi-speed.

8. The apparatus of claim 7, wherein the system controller detects the first and second track numbers, based on a tracking error signal generated in the rotation of the disc.

9. The apparatus of claim 5, wherein the memory unit stores a number of the amounts of vibration by dividing a number of detected differences by an integer.

* * * * *